UNITED STATES PATENT OFFICE.

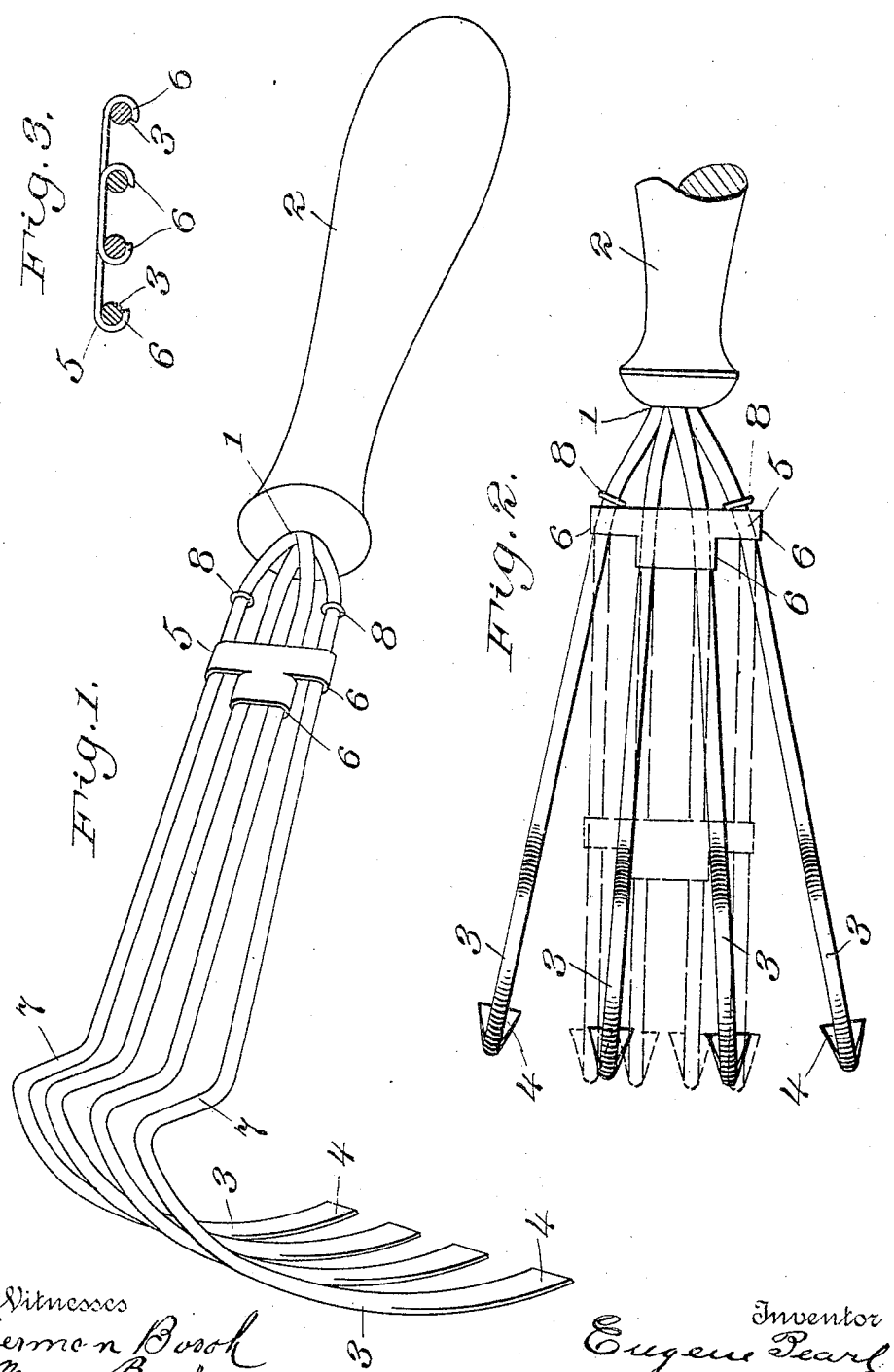

EUGENE PEARL, OF PASSAIC, NEW JERSEY.

WEEDER.

No. 841,431.   Specification of Letters Patent.   Patented Jan. 15, 1907.

Application filed November 20, 1906. Serial No. 344,222.

*To all whom it may concern:*

Be it known that I, EUGENE PEARL, a citizen of the United States, residing at Passaic, in the county of Passaic and State of New Jersey, have invented certain new and useful Improvements in Weeders, of which the following is a specification.

My invention relates generally to gardening-tools, and as herein embodied is designed to produce a tool of the weeder type of a form adapted for use as a rake, hoe, &c.

A tool constructed in accordance with my invention is illustrated in the accompanying drawings, in which—

Figure 1 is a view in perspective thereof. Fig. 2 is a plan view, and Fig. 3 is a detail cross-section.

Referring to the drawings, the tool as shown is preferably formed of several pieces of stout spring-wire which are twisted together throughout a portion of their length, forming a shank 1. The shank is fitted in a suitable handle 2, and the free ends of the wires extending outward therefrom are spread and bent up to form a series of tines 3, which are flattened at their extremities, as indicated at 4.

Constructed as described, the tool is of a form suitable for use as a hand-rake, and in order that it may be readily adapted for chopping, hoeing, &c., a spacing-bar 5 is slidingly mounted upon the tines and when moved forward, as indicated by dotted lines in Fig. 2, draws their flattened extremities together until they meet, forming practically a continuous cutting-blade, as shown. By shifting the bar 5 backward or forward the tines may be opened or closed as required to adapt them to the distance separating the rows of plants, as will be obvious.

The spacing-bar is preferably formed of a strip of sheet metal having portions 6 struck up and shaped to partly encircle each of the tines. Its outward movement is limited by the bent-up portion 7 of the tines and its inward movement by stops 8.

The extreme simplicity, effectiveness, low cost of manufacture, as well as the many other advantages of the invention, will be apparent from the foregoing description.

I claim—

1. A tool comprising a series of wires secured together at one end to form a shank and having straight portions extending outward from the shank and terminating in bent-up extremities, and means for varying the spacing of the free ends of the wires.

2. A tool comprising a series of wires twisted together at one end to form a shank and having straight portions extending outward from the shank and terminating in bent-up flattened extremities, and means for securing said flattened extremities, in such relation as to form a continuous cutting edge.

3. A tool comprising a series of spring-wires twisted together at one end to form a shank and having straight portions extending outward from the shank in different directions and terminating in bent-up extremities, and a spacing-bar engaging each of the wires and movable thereon to vary the distance separating their free ends.

4. A tool comprising a handle having a series of wires extending outward therefrom in diverging relation and terminating in bent-up extremities, and a spacing-bar shaped to partly encircle each of the wires and movable thereon to vary the distance separating the bent-up ends thereof.

In testimony whereof I, EUGENE PEARL, have signed my name to this specification, in the presence of two subscribing witnesses, this 19th day of November, 1896.

EUGENE PEARL.

Witnesses:
 MARY BUSCH,
 E. C. EVANS.